(12) United States Patent
Frank

(10) Patent No.: US 8,061,848 B1
(45) Date of Patent: Nov. 22, 2011

(54) METHODS AND APPARATUS FOR PROJECTING IMAGES

(76) Inventor: Adam Charles Frank, Brooklyn, NY (US)

( * ) Notice: Subject to any disclaimer, the term of this patent is extended or adjusted under 35 U.S.C. 154(b) by 916 days.

(21) Appl. No.: 12/018,569

(22) Filed: Jan. 23, 2008

Related U.S. Application Data

(60) Provisional application No. 60/886,760, filed on Jan. 26, 2007.

(51) Int. Cl.
*G03B 21/26* (2006.01)
*F21V 5/00* (2006.01)

(52) U.S. Cl. ........ 353/35; 353/62; 362/311.13; 362/806

(58) Field of Classification Search .................... 353/20, 353/35, 62; 362/311.13, 806, 810
See application file for complete search history.

(56) References Cited

U.S. PATENT DOCUMENTS

| | | | | |
|---|---|---|---|---|
| 1,908,203 A * | 5/1933 | Wilfred | ............................ | 472/61 |
| 2,201,689 A * | 5/1940 | Disney | ............................ | 352/52 |
| 2,818,770 A * | 1/1958 | Cilurzo | ............................ | 353/62 |
| 2,977,845 A * | 4/1961 | Boone | ............................ | 352/87 |
| 3,216,318 A * | 11/1965 | Gaffard | ............................ | 353/97 |
| 3,350,803 A * | 11/1967 | Stockwell | ............................ | 40/434 |
| 3,582,202 A * | 6/1971 | Donald | ............................ | 353/20 |
| 3,643,361 A * | 2/1972 | Eaves | ............................ | 40/437 |
| 3,683,779 A * | 8/1972 | Lifton | ............................ | 396/3 |
| 3,756,701 A * | 9/1973 | Ajero | ............................ | 359/868 |
| 3,811,213 A * | 5/1974 | Eaves | ............................ | 40/437 |
| 4,405,219 A * | 9/1983 | Yasuda et al. | ............................ | 353/37 |
| 4,434,467 A * | 2/1984 | Scott | ............................ | 700/90 |
| 4,756,614 A * | 7/1988 | Kato et al. | ............................ | 353/35 |
| 5,311,226 A * | 5/1994 | Karasawa | ............................ | 353/30 |
| 5,586,089 A * | 12/1996 | McGarvey | ............................ | 368/223 |
| 6,323,971 B1 * | 11/2001 | Klug | ............................ | 359/24 |
| 6,488,393 B1 * | 12/2002 | Burnham | ............................ | 362/318 |
| 2009/0213331 A1 * | 8/2009 | O'Connell et al. | ............................ | 353/10 |
| 2010/0207961 A1 * | 8/2010 | Zomet | ............................ | 345/630 |

\* cited by examiner

*Primary Examiner* — John Lee
(74) *Attorney, Agent, or Firm* — Chapin IP Law, LLC

(57) ABSTRACT

Methods and apparatus provide for Reveal. Reveal includes a lens and a light source mounted within a housing. The light source projects light through the lens onto a projection surface. A first slide, a second slide and a motion slide are mounted in the housing between the light source and the lens. The first slide causes light from the light source to project a first defined image upon the projection surface. The second slide, which is less focused than the first defined image, causes light from the light source to project a second defined image upon the projection surface. The motion slide includes motion elements movable in response to a stimulus, such as airflow. Movement by the motion elements introduce an interference in light cast by the light source onto the projection surface. The interference provides an appearance of movement of an image projected by the second slide.

19 Claims, 7 Drawing Sheets

METHODS AND APPARATUS FOR PROJECTING IMAGES

PRIORITY TO PROVISIONAL APPLICATION

This U.S. Utility patent application claims the benefit of the filing date of earlier filed U.S. Provisional Application for patent having U.S. Ser. No. 60/886,760, filed Jan. 26, 2007 entitled "Methods and Apparatus for Projecting Images". The entire teaching, disclosure and contents of this provisional patent are hereby incorporated by reference herein in their entirety.

BACKGROUND

Light sources such as electric filaments (e.g. light bulbs) or candles are often used to illuminate surfaces. As an example, a candle on a dining table is commonly used for soft lighting during dining, and lamps of various shapes, sizes and intensities are common in homes and other locations for purposes of illumination. Light sources can also be included within conventional projectors. Such conventional projectors utilize a light source to project an image onto a wall.

SUMMARY

Conventional slide projectors include contained electric light sources that are used to illuminate a semi-transparent slide placed in a plane that is substantially evenly perpendicular to the light source. That is, the light source is centered with respect to the semi-transparent slide. In this manner, the image contained within the semi-transparent slide is projected onto a surface, such as a screen, to allow a viewer to view the projected image. The projected image is a magnified replication of the semi-transparent slide's image. Optimally, such conventional projectors are designed to pass light from the light source directly through the semi-transparent slide without any manipulation of the light's path. This results in projecting the semi-transparent slide's image in its entirety.

Conventional projectors suffer from a variety of deficiencies. For example, the projected image appears in a static format. That is, portions of the projected image are not enhanced to provide an appearance of movement.

Techniques discussed herein significantly overcome the deficiencies of conventional applications such as those discussed above as well as additional techniques also known in the prior art. As will be discussed further, certain specific embodiments herein are directed to Reveal. The one or more embodiments of Reveal as described herein contrast with conventional systems to allow for projecting multiple images, each having a different focus, to create an aggregate image upon a projection surface. The aggregate image includes portions of the multiple images. Additionally, Reveal creates an illusion of movement within portions of the aggregate image.

For example, in one embodiment, Reveal utilizes a first image, a second image and a motion slide. The first image is a sharply focused image of a window pane in a window frame. The second image is a less focused image of a common outdoor object, such as a tree. The motion slide has movable elements, such as foil ribbons that flap, waver or otherwise move slightly due to airflow provided by a fan or heat from a lamp. The movement of the movable elements modifies the amount of light passed through the first and second images. As the light is cast to project the first and second images, the first and second images become overlayed to create an aggregate image. The aggregate image is made up of portions of the first and second images. As the aggregate image is projected onto a projection surface, the cast light creates a subtle illusion of wind moving through a tree which seems to be located outside of a window. In addition, Reveal also creates an impression of sunlight streaming through the window and onto an interior wall.

Specifically, Reveal includes a lens mounted within a housing. A light source, operable to project light through the lens onto a projection surface, is also mounted in the housing. A first slide is mounted in the housing between the light source and the lens. The first slide causes light from the light source to project a sharply focused first defined image upon the projection surface. A second slide, which is less focused than the first defined image, is also mounted in the housing between the light source and the lens. The second slide causes light from the light source to project a second defined image upon the projection surface.

A motion slide is also mounted in the housing between the light source and the lens. The motion slide includes motion elements with reflective surfaces that are movable in response to a stimulus. The movement of the motion elements introduces an interference in the light cast by the light source onto the projection surface. The interference thereby provides an appearance of movement of the image projected by the second slide.

Reveal can be placed on a shelf or mounted directly on a wall or ceiling or floor or within an object such as a table or other housing. Reveal can be pointed at any interior surface. The aggregate image projected by Reveal is used as an ambient light source.

Example embodiments of the invention may be implemented as a lighting apparatus sold under the name "Reveal" manufactured by Adam Frank, Inc. of New York, N.Y., USA.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
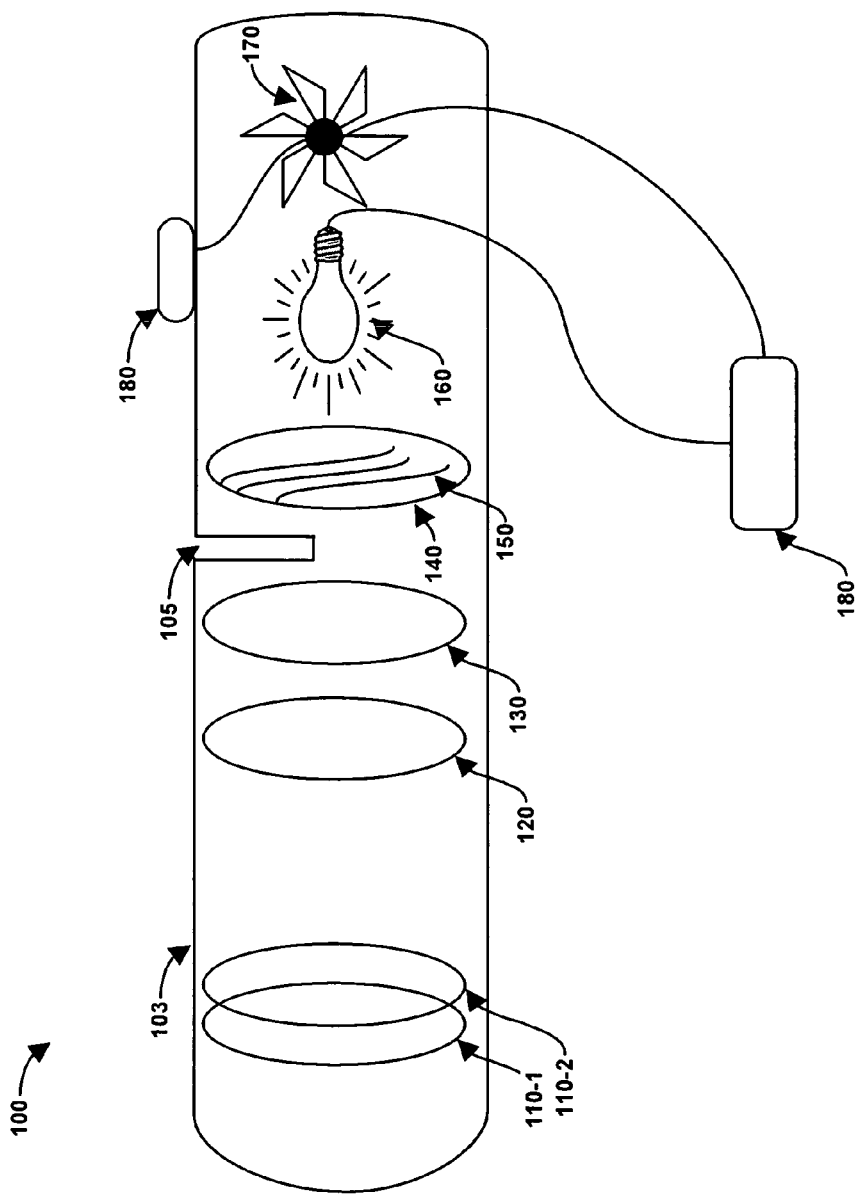
FIG. 1 is an example configuration of a lighting apparatus for casting an aggregate image.

FIG. 1 is an example configuration of a lighting apparatus for casting an aggregate image. As illustrated in FIG. 1, an embodiment of Reveal 100 includes two lenses 110-1, 110-2 mounted within a housing 103. A light source 160, operable to project light through the lenses 110-1, 110-2 onto a projection surface, is mounted in the housing 103. The light source 160 can be an incandescent, fluorescent, LED or halogen Electric bulb or other light source for generating light.

A first slide 120 is mounted in the housing 103 between the light source 160 and the lenses 110-1, 110-2. The first slide 120 causes light from the light source to project a first defined image upon the projection surface. For example, the first slide 120 can be a photographic slide, a laser cut foil or an acid etched metal image that projects a sharply defined image onto the projection surface (i.e. a wall, ceiling, screen)

A second slide 130 is mounted in the housing 103 between the light source 160 and the lenses 110-1, 110-2. The second slide 130 causes light from the light source 160 to project a second defined image upon the projection surface. However, the second defined image is less focused (i.e. out of focus) than the first defined image. The second slide 130 can also be a photographic color slide, a laser cut foil or an acid etched metal image.

A motion slide 140 is also mounted in the housing 103 between the light source 160 and the lenses 110-1, 110-2. The motion slide includes a motion element 150 that is movable in response to a stimulus, such as airflow or heat created by the light source 160. Movement from the motion element 150 introduces an interference in light cast by the light source 160 onto the projection surface. The interference created by movement of the motion element 150 provides an appearance of movement of an image projected by the second slide 130. It is understood that the motion slide 140 can include multiple motion elements 150.

The motion slide 140 is disposed in the housing 103 between the light source 160 and the second slide 130. The second slide 130 is disposed in the housing 103 between the motion slide 140 and the first slide 120. The first slide 120 is disposed in the housing 103 between the second slide 130 and the lens 110-1 and lens 110-2. It is understood that lens 110-1, lens 110-2, the first slide 120, the second slide 130, the motion slide 140 and the light source 160 are substantially aligned along a common axis.

A fan 170, coupled to the housing 103, provides airflow within the housing 103 to provide the stimulus to the motion element 150. The interference is created as the stimulus from the fan's 170 airflow causes motion element 150 to undulate.

The fan 170 is mounted in the housing 103 behind the light source 160. Reveal 100 includes a fan speed control 180 electrically coupled to the fan 170 to allow adjustment of the airflow to control an amount of the interference in light cast by the light source 160. Both the fan 170 and the light source 160 are electrically couple to a power source 180. However, in another embodiment, the fan 170 and the light source 160 can be powered by a solar panel.

An opening 105 is also defined in the housing 103. The opening 105 releases a portion of the airflow within the housing 103. As depicted in FIG. 1, the opening 105 is a slot defined in the housing 103 at a location proximate to where the motion slide 140 is mounted within the housing 103.

Figure 2:
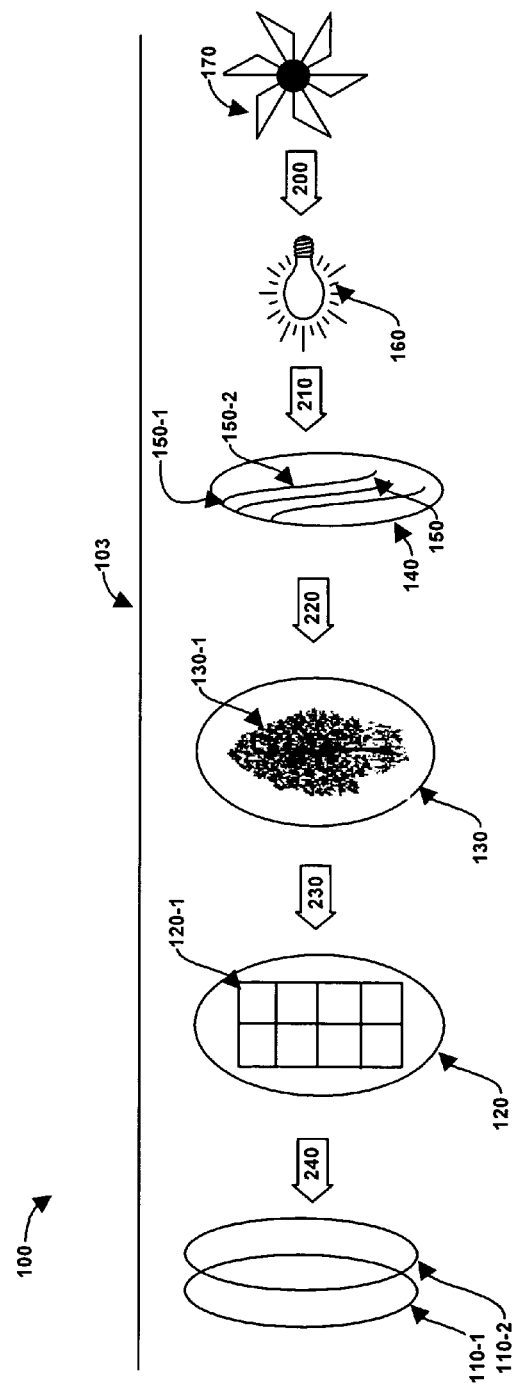
FIG. 2 is an example configuration of a lighting apparatus for casting an aggregate image based on a focused image of a window and a less focused image of a tree.

Referring now to another embodiment of Reveal 100, as illustrated in FIG. 2. FIG. 2 is an example configuration of a lighting apparatus for casting an aggregate image based on a focused image of a window and a less focused image of a tree.

The first slide 120 defines openings that produce a focused window image 120-1 as the first defined image on the projection surface. The second slide 130 defines a shape of an object (such as an "out-of-focus" tree) cast as the second defined image 130-1. As both defined images 120-1, 130-1 are concurrently projected upon the projection surface to create an aggregate image 240, the second defined image 130-1 (i.e. the "out-of-focus" tree) appears to a viewer as though it is behind and outside of the focused window image 120-1.

The first slide 120 is positioned relative to lens 110-1 and lens 110-2 to allow projection of the first defined image 120-1 (i.e. the window image) in a focused format. As light cast by the light source 160 streams through the housing 103, the first and second defined images 120-1, 130-2 overlap to create the aggregate image 240 on the projection surface.

Reveal 100 thereby creates the illusion that portions of the aggregate image 240, created by the second slide 130, appear to be farther behind portions of the aggregate image 240 produced by the first slide 120. Reveal 100 also creates the illusion of movement of the portions of the aggregate image 240 created by the second slide 130. Hence, the aggregate image 240 appears as a window providing a view of a tree that seems to be "outside" of the window. In addition, the leaves of the tree will appear to be moving as though a light wind was passing through the tree.

To create the aggregate image 240 based on an overlay of the first and second defined images 120-1, 130-1, airflow 200 is sent through the housing 103 as the fan 170 is operated. Since the fan 170 is mounted behind the light source 160, a mixture 210 of light and airflow interact with the motion element 150 of the motion slide 140. It is understood that the motion slide 140 can contain more than one motion element 150. Further, each motion element 150 can be a metallic chain, a metallic thread or any ribbon (i.e. strand) of material that gives the motion element 150 a reflective surface.

Each motion element 150 comprises a movable portion 150-2 and a fixed portion 150-1. The fixed portion 150-1 is coupled to the motion slide 140. The movable portion 150-2 is able to move (i.e. sway, vibrate, undulate) relative to the fixed portion 150-1 in response to a stimulus, such as the mixture 210 of light and airflow passing through the motion slide 140. By responding to the stimulus, the motion element 150 creates an interference (i.e. light randomly refracted off the surface of the undulating motion element 150) in the light cast by the light source 160.

A combination 220 of the interference, airflow and light cast by the light source is sent through the second slide 130. As the combination 220 passes through the second slide 130, the light interacts with the second defined image 130-1 (i.e. the "out-of-focus tree" image) to illuminate portions of the second defined image 130-1.

A new combination 230 of the interference, airflow and light cast by the light source is sent through the first slide 120. The light provided in the new combination 230 also includes illuminated portions of the second defined image 130-1 (i.e.

the out-of-focus tree image). As the new combination 220 passes through the first slide 120, the light interacts with the first defined image 120-1 (i.e. the focused window image) to illuminate portions of the first defined image 120-1.

The aggregate image 240 is created as illuminated portions of the first defined image 120-1 (i.e. the focused window image) are included with the illuminated portions of the second defined image 130-1 (i.e. the out-of-focus tree image). Hence, as the aggregate image 240 passes through lenses 110-1, 110-2, it includes light not blocked by the first and second slides 120, 130 and includes shadows produced by the first and second slides 120, 130.

Figure 3:
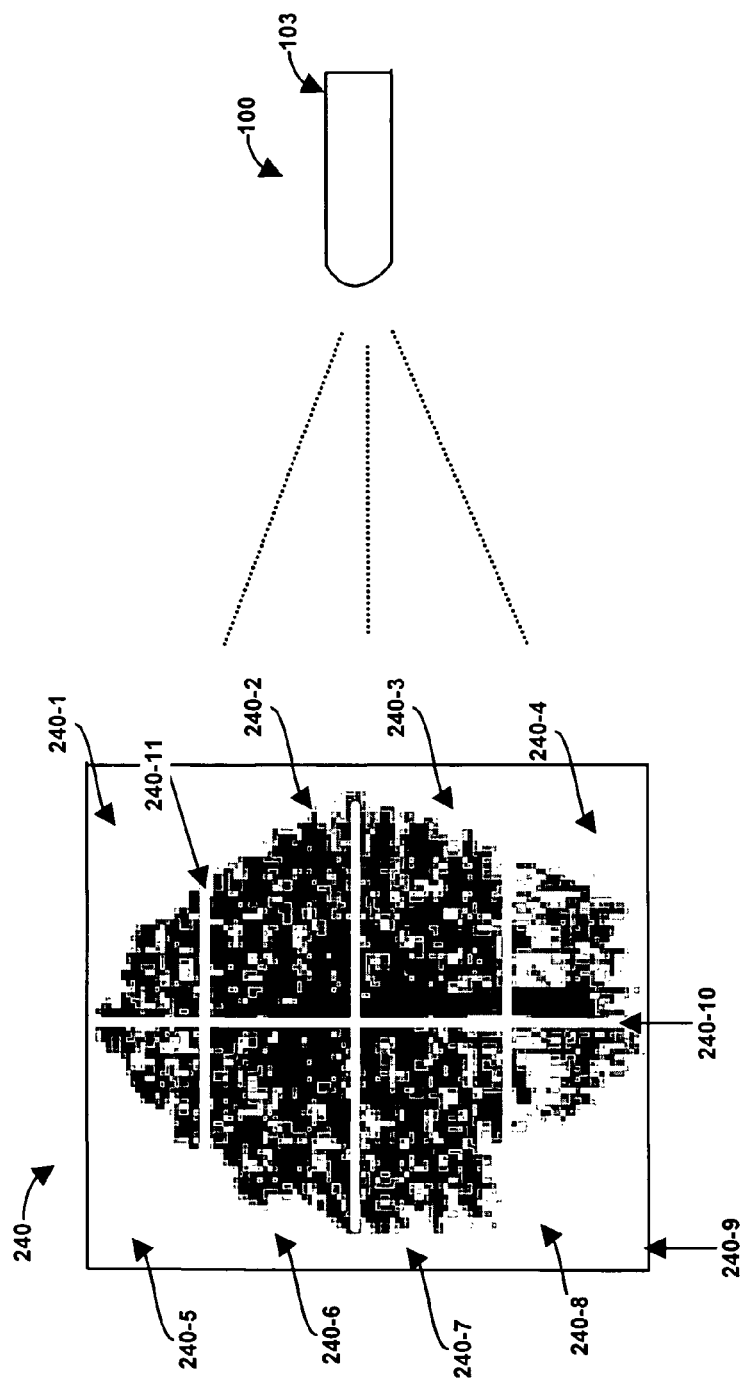
FIG. 3 is an example of an aggregate image, based on a focused image of a window and a less focused image of a tree, cast by a projector apparatus.

Turning now to FIG. 3, FIG. 3 is an example of an aggregate image, based on a focused image of a window and a less focused image of a tree, cast by a projector apparatus. Specifically, FIG. 3 depicts an aggregate image 240 being projected by Reveal 100. The aggregate image 240 provides the appearance of a window with window frames on a projection surface, such as a wall. An image of a tree is included as part of the aggregate image 240 as well.

Reveal 100 creates the aggregate image 240 such that a view of a tree appears through the window. The tree seems to be outside, or farther behind, the placement of the window. In addition, the tree and its leaves appear to be moving in a subtle motion.

Portions 240-1, 240-2, 240-3, 240-3, 240-5, 240-6, 240-7, 240-8 of the aggregate image 240 are created by the second slide 130 mounted in the housing 103. The aggregate image 240 also includes portions 240-9, 240-10, 240-11 which are created by the first slide 120 mounted in the housing 103.

In one embodiment of Reveal 100, where the first slide 120 is an opaque shape that defines the image of the window 120-1, portions 240-9, 240-10, 240-11 are silhouettes created by light blocked by the first slide 120. For example, one portion 240-9 is a silhouette of the edge of a window (i.e. window sill). Other portions 310-10, 310-11 are silhouettes of window frames.

As previously discussed, the second slide 130, which provides the "out-of-focus" tree image 130-1, is positioned between the first slide 120 and the light source 160. Since the first slide 120, the second slide 130 and the light source 160 are aligned on a common axis, parts of the "out-of-focus" tree image 130-1 will be in line with parts of the first slide's 120 window image 120-1 that create the silhouettes (e.g. 240-9, 240-10, 240-11). Thus, the silhouettes (e.g. 240-9, 240-10, 240-11) created by the first slide 120 will completely block out parts of the "out-of-focus" tree image 130-1 from being displayed in the aggregate image 240.

Additionally, the interference provided by the motion element 150 effects portions 240-1, 240-2, 240-3, 240-3, 240-5, 240-6, 240-7, 240-8 of the aggregate image 240 created by the second slide 130 more than portions 240-9, 240-10, 240-11 of the aggregate image 240 created by the first slide 120. With respect to those portions 240-1, 240-2, 240-3, 240-3, 240-5, 240-6, 240-7, 240-8, an illusion of movement is created such that the leaves and branches of the tree from the "out-of-focus" tree image 130-1 appear to be moving.

Figure 4:
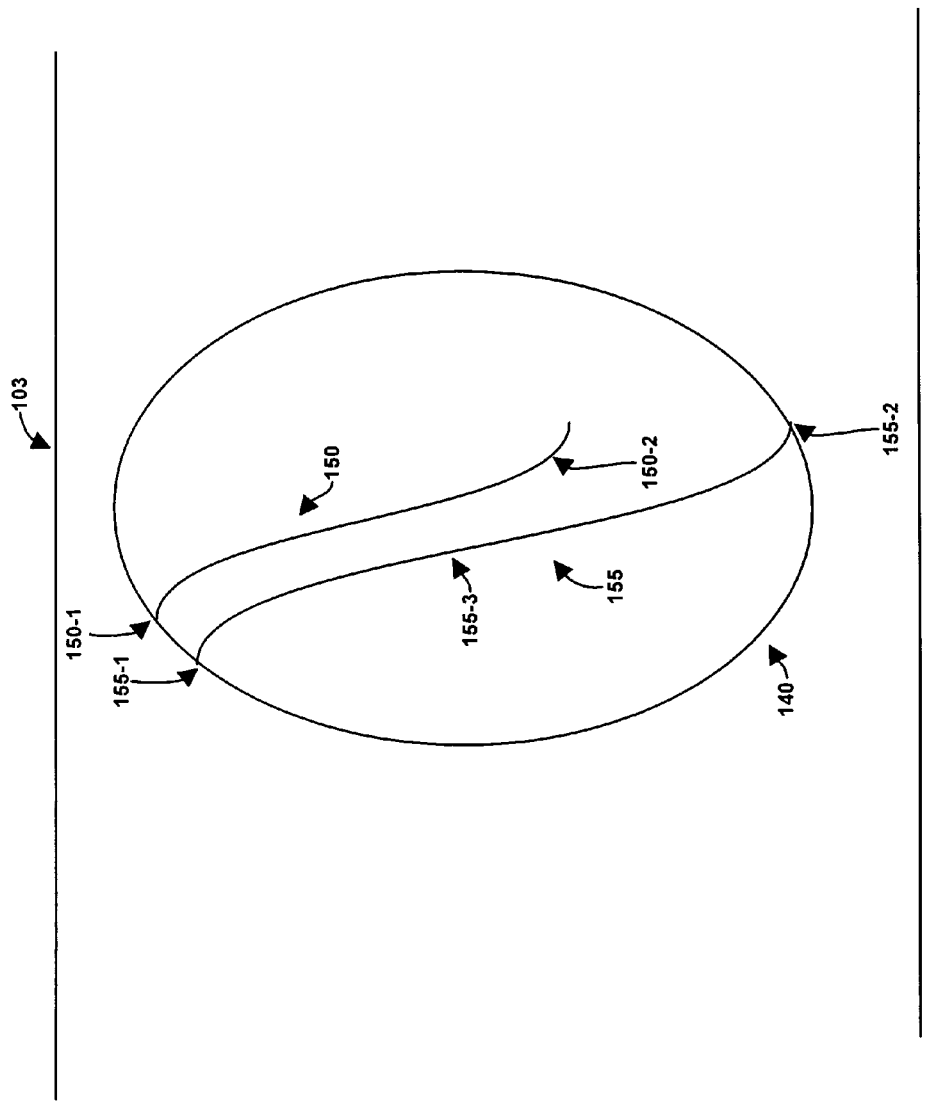
FIG. 4 is an example configuration of a motion element in a motion slide within a housing of a lighting apparatus.

Regarding FIG. 4, FIG. 4 is an example configuration of motion elements in a motion slide within a housing of a lighting apparatus. Motion element 150 can be mounted to a motion slide 140 at a fixed portion 150-1. The motion element 150 also has a movable portion 150-2 that dangles freely in the motion slide 140.

In response to a stimulus, such as a mixture 210 of light and airflow passing through the motion slide 140 or heat from the light source 160, the movable portion 150-2 will move. As the movable portion 150-2 moves, the motion element 150 undulates in a random manner. Such undulation causes light to be randomly refracted off the reflective surface of the motion element 150. Thus, as light cast by the light source 160 passes through the motion slide 140, an interference in the light is created from the motion element's 150 movement.

Another embodiment of a motion element 155 can include two fixed portions 155-1, 155-2 such that the motion element 155 is coupled to the motion slide 140 (or housing 103) at two locations. However, the motion element 155 can have a length the provides slack between the two fixed portions 155-1, 155-2. The slack creates a movable portion 155-2 even though the motion element 155 does not dangle freely. Hence, an interference can be created as the movable portion 155-2 responds to a stimulus, such as a mixture 210 of light and airflow passing through the motion slide 140 or heat from the light source 160.

Figure 5:
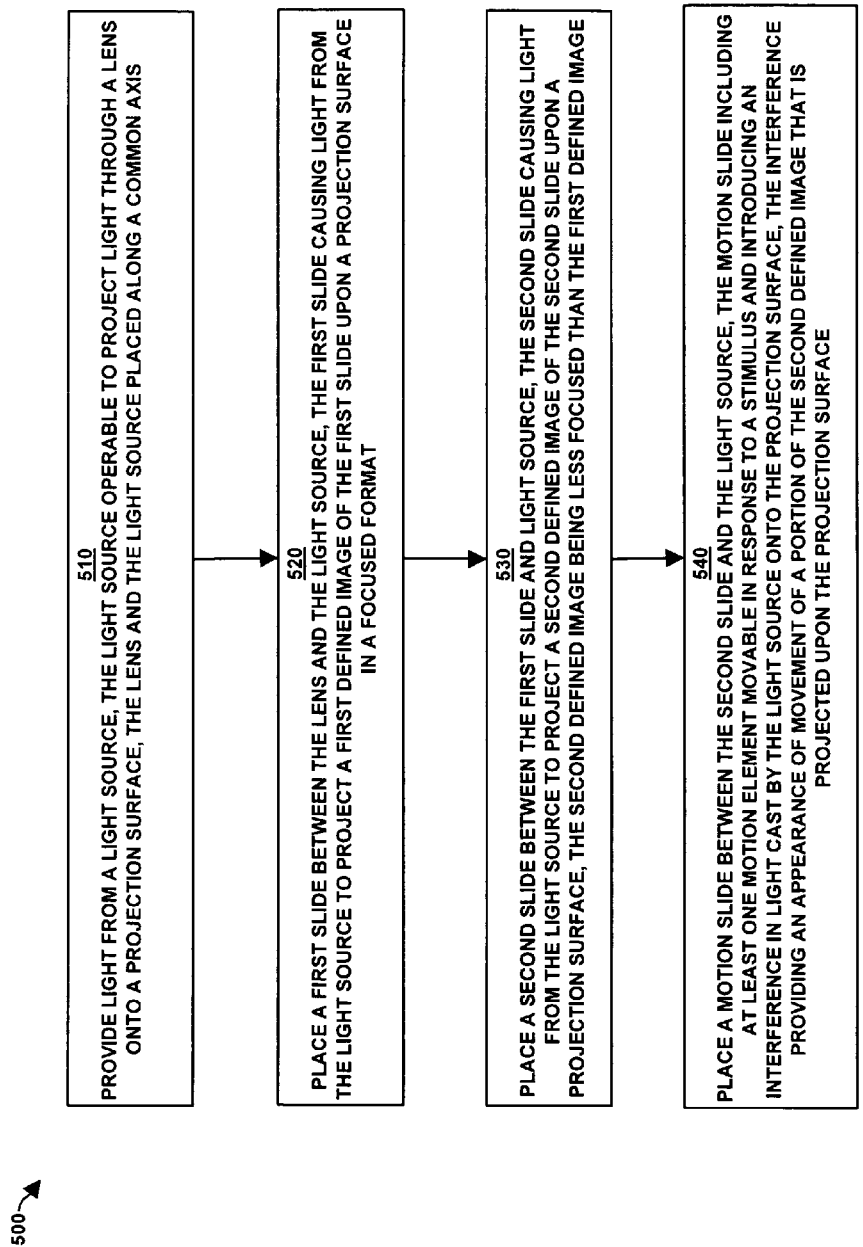
FIG. 5 is a set of steps that provide a method for casting an aggregate image using the lighting apparatus disclosed herein.
Figure 6:
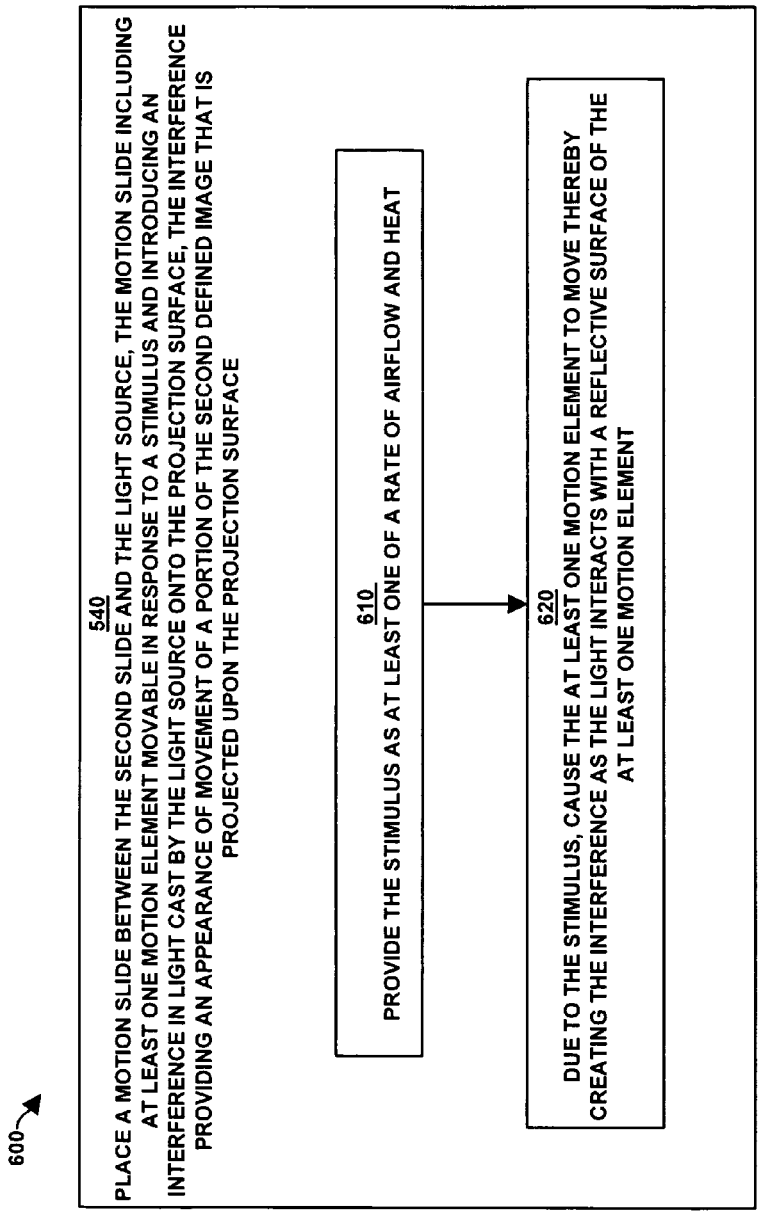
FIG. 6 is a set of steps that provide a method for creating an interference using the lighting apparatus disclosed herein.
Figure 7:
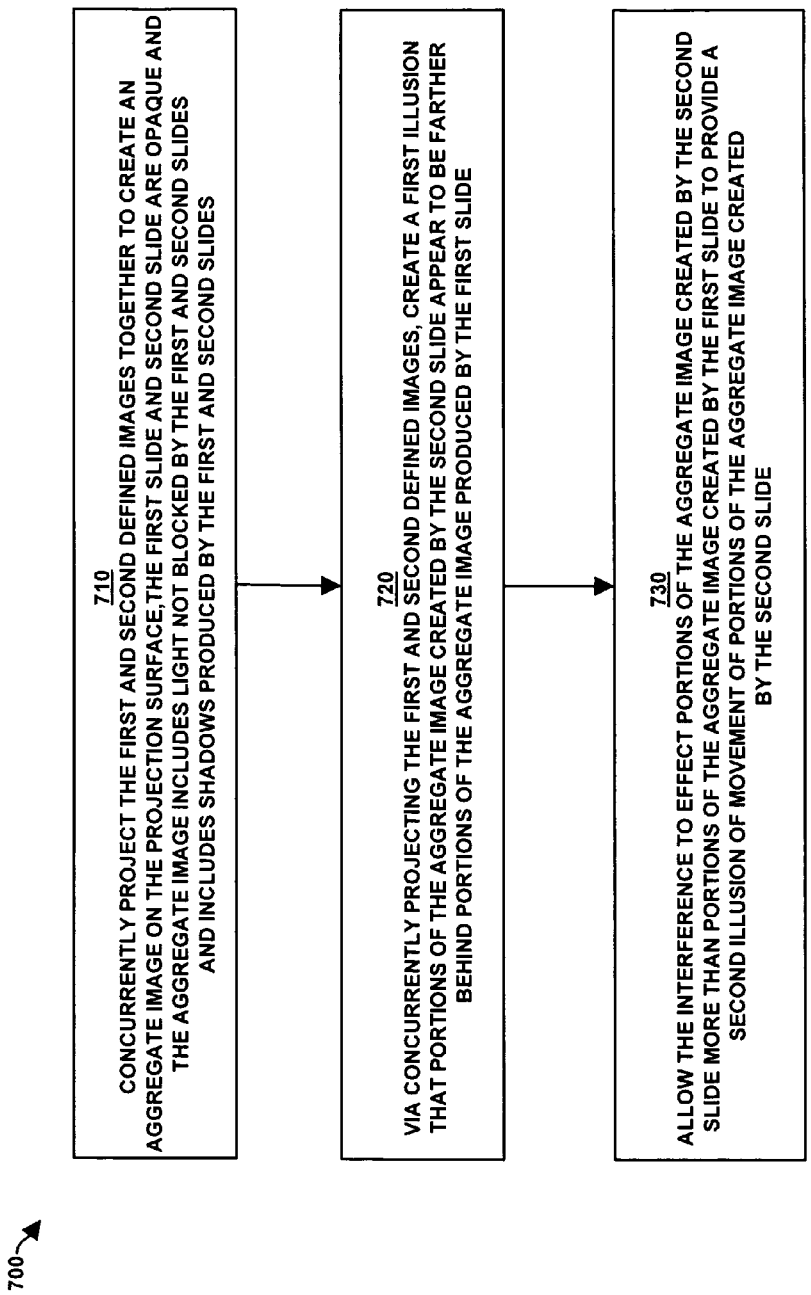
FIG. 7 is a set of steps that provide a method for casting an aggregate image using the lighting apparatus disclosed herein.

FIGS. 5-7 illustrate various embodiments of Reveal 100. The rectangular elements in flowcharts 500, 600 and 700 denote "method steps." It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

As shown in FIG. 5, flowchart 500 provides steps that provide a method for casting an aggregate image using the lighting apparatus disclosed herein.

At step 510, Reveal 100 provides light from a light source 160. The light source 160 is operable to project light through a lens 110-1, 110-2 onto a projection surface. It is understood that the lenses 110-1, 110-2 and the light source 160 are placed along a common axis.

At step 520, Reveal 100 places a first slide 120 between a lens 110-1, 110-2 and the light source 160. The first slide 120 causes light from the light source 160 to project a first defined image 120-1 of the first slide 120 upon a projection surface in a focused format.

At step 530, Reveal 100 places a second slide 130 between the first slide 120 and light source 160. The second slide 130 causes light from the light source 160 to project a second defined image 130-1 of the second slide upon a projection surface. The second defined image 130-1 is projected as less focused than the first defined image 120-1.

At step 540, Reveal 100 places a motion slide 140 between the second slide 130 and the light source 160. The motion slide 140 includes at least one motion element 150 which is movable in response to a stimulus. The motion element 150 introduces an interference in light cast by the light source onto the projection surface, thereby providing an appearance of movement of a portion of the second defined image 130-1 that is projected upon the projection surface.

As shown in FIG. 6, flowchart 600 provides steps that provide a method for creating an interference using the lighting apparatus disclosed herein.

At step 610, Reveal 100 provides a stimulus as a rate of airflow or heat.

At step 620, Reveal 100 allows the stimulus to cause the motion element 150 to move thereby creating the interference as the light interacts with a reflective surface of the motion element 150.

As shown in FIG. 7, flowchart 700 provides steps that provide a method for casting an aggregate image using the lighting apparatus disclosed herein.

At step 710, Reveal 100 concurrently projects the first and second defined images 120-1, 130-1 together to create an aggregate image 240 on the projection surface. The first slide 120 and second slide 130 are opaque and the aggregate image 240 includes light not blocked by the first and second slides 120, 130 and includes shadows produced by the first and second slides 120, 130.

Via concurrently projecting the first and second defined images 120-1, 130-1, at step 720, Reveal 100 creates a first illusion that portions 240-1, 240-2, 240-3, 240-3, 240-5, 240-6, 240-7, 240-8 of the aggregate image 240 created by the second slide 130 appear to be farther behind portions 240-9, 240-10, 240-11 of the aggregate image 240 produced by the first slide 120.

At step 730, Reveal 100 allows the interference to effect portions 240-1, 240-2, 240-3, 240-3, 240-5, 240-6, 240-7, 240-8 of the aggregate image 240 created by the second slide 130 more than portions 240-9, 240-10, 240-11 of the aggregate image 240 created by the first slide 120 to provide a second illusion of movement of portions 240-1, 240-2, 240-3, 240-3, 240-5, 240-6, 240-7, 240-8 of the aggregate image 240 created by the second slide 130.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A projector apparatus, comprising:
    a housing;
    a lens mounted within the housing;
    a light source mounted in the housing and operable to project light through the lens onto a projection surface;
    a first slide mounted in the housing between the light source and the lens, the first slide causing light from the light source to project a first defined image upon the projection surface; and
    a second slide mounted in the housing between the light source and the lens, the second slide causing light from the light source to project a second defined image upon the projection surface, the second defined image being less focused than the first defined image;
    a motion slide mounted in the housing between the light source and the lens, the motion slide including at least one motion element movable in response to a stimulus and introducing an interference in light cast by the light source onto the projection surface, the interference providing an appearance of movement of an image projected by the at least one second slide
    wherein the stimulus is provided as airflow causing the at least one motion element to move thereby creating the interference as the light interacts with a reflective surface of the at least one motion element.

2. The projector apparatus of claim 1, wherein the at least one motion element comprises a movable portion and a fixed portion, the movable portion being able to move relative to the fixed portion in response to the stimulus to introduce the interference in light cast by the light source onto the projection surface.

3. The projector apparatus of claim 2 wherein the at least one motion element comprises one of a metallic chain, a metallic thread and a reflective surface.

4. The projector apparatus of claim 1 comprising:
    a fan coupled to the housing, the fan providing the airflow within the housing to provide the stimulus to the at least one motion element causing the at least one motion element to undulate thereby creating the interference.

5. The projector apparatus of claim 4 wherein:
    the fan is mounted in the housing behind the light source; and
    the projector apparatus including a fan speed control electrically coupled to the fan to allow adjustment of the airflow to control an amount of the interference in light cast by the light source onto the projection surface.

6. The projector apparatus of claim 4 comprising at least one opening defined in the housing to release a portion of the airflow within the housing.

7. The method of claim 6 wherein the at least one opening is at least one slot defined in the housing at a location proximate to the motion slide.

8. The projector apparatus of claim 1 comprising:
    the motion slide is disposed in the housing between the light source and the second slide;
    the second slide is disposed in the housing between the motion slide and the first slide; and
    the first slide is disposed in housing between the second slide and the lens; and wherein the lens, the first slide, the second slide, the motion slide and the light source are substantially aligned along a common axis.

9. The projector apparatus of claim 1 wherein:
    the first slide is positioned relative to the lens to allow projection of the first defined image in a focused format;
    the first and second defined images overlap to create an aggregate image on the projection surface;
    and wherein portions of the aggregate image created by the second slide appear to be farther behind portions of the aggregate image produced by the first slide.

10. The projector apparatus of claim 1 wherein:
    the first slide is positioned relative to the lens to allow projection of the first defined image in a focused format;
    the first and second defined images are concurrently projected together to create an aggregate image on the projection surface;
    and wherein portions of the aggregate image created by the second slide appear to be farther behind portions of the aggregate image produced by the first slide.

11. The projector apparatus of claim 10 wherein:
    the first slide and second slide are opaque and the aggregate image includes light not blocked by the first and second slides and includes shadows produced by the first and second slides.

12. The projector apparatus of claim 11 wherein the interference provided by the at least one motion element effects portions of the aggregate image created by the second slide more than portions of the aggregate image created by the first slide to provide the illusion of movement of portions of the aggregate image created by the second slide.

13. The projector apparatus of claim 1 wherein:
    the first slide defines openings that produce a focused window image as the first defined image on the projection surface; and
    the second slide defines a shape of an object cast as the second defined image that appears to be behind and outside of the focused window image.

14. The projector apparatus of claim 13 wherein the interference provides an illusion of movement of the object cast as the second defined image.

15. The projector apparatus of claim 13 wherein the shape of the object is a plant and wherein the interference in light cast by the light source onto the projection surface causes the second defined image of the plant to appear to move.

16. A method comprising:
 providing light from a light source; the light source operable to project light through a lens onto a projection surface, the lens and the light source placed along a common axis;
 placing a first slide between the lens and the light source, the first slide causing light from the light source to project a first defined image of the first slide upon a projection surface in a focused format;
 placing a second slide between the first slide and light source, the second slide causing light from the light source to project a second defined image of the second slide upon a projection surface, the second defined image being less focused than the first defined image;
 placing a motion slide between the second slide and the light source, the motion slide including at least one motion element movable in response to a stimulus and introducing an interference in light cast by the light source onto the projection surface, the interference providing an appearance of movement of a portion of the second defined image that is projected upon the projection surface; and
 wherein introducing an interference in light cast by the light source onto the projection surface includes:
 providing the stimulus as at least one of a rate of airflow and heat; and
 due to the stimulus, causing the at least one motion element to move thereby creating the interference as the light interacts with a reflective surface of the at least one motion element.

17. The method as in claim 16, comprising:
 concurrently projecting the first and second defined images together to create an aggregate image on the projection surface, the first slide and second slide are opaque and the aggregate image includes light not blocked by the first and second slides and includes shadows produced by the first and second slides;
 via concurrently projecting the first and second defined images, creating an first illusion that portions of the aggregate image created by the second slide appear to be farther behind portions of the aggregate image produced by the first slide; and
 allowing the interference to effect portions of the aggregate image created by the second slide more than portions of the aggregate image created by the first slide to provide a second illusion of movement of portions of the aggregate image created by the second slide.

18. The method as in claim 16, comprising:
 defining openings in the first slide that produce a focused window image as the first defined image on the projection surface; and
 for the second slide, defining the shape of an object cast as the second defined image that appears to be behind and outside of the focused window image.

19. The projector apparatus of claim 1 further comprising a lamp disposed within the housing, the lamp providing heat to generate airflow within the housing to provide the stimulus to the at least one motion element causing the at least one motion element to undulate thereby creating the interference.

* * * * *